United States Patent [19]
Lackey et al.

[11] Patent Number: 5,178,676
[45] Date of Patent: Jan. 12, 1993

[54] SURFACTANT TREATED CLAYS USEFUL AS ANTI-TACK AGENTS FOR UNCURED RUBBER COMPOUNDS

[75] Inventors: Walter O. Lackey; Carl J. Marshall, both of Macon; James E. Sikes, Cochran; Gary M. Freeman, Macon, all of Ga.

[73] Assignee: J. M. Huber Corporation, Rumson, N.J.

[21] Appl. No.: 607,189

[22] Filed: Oct. 31, 1990

[51] Int. Cl.$^5$ .............................................. C09K 15/00
[52] U.S. Cl. .......................... 106/287.14; 106/287.16; 427/384; 427/385.5; 427/416; 428/331; 428/403; 428/404; 428/543; 501/148
[58] Field of Search .............. 428/403, 404, 331, 492, 428/543; 524/501, 522; 252/382, 383, 384, 385, 131, 28, 49.5; 106/272, 2, 287.17, 632, 287.14, 287.16; 427/413, 416, 279, 384, 385.5; 501/148

[56] References Cited

U.S. PATENT DOCUMENTS

| | | | |
|---|---|---|---|
| 2,147,312 | 2/1939 | Partridge | 106/287.17 |
| 4,306,994 | 12/1981 | Ellslager | 252/382 |
| 4,354,001 | 10/1982 | Kuan | 524/501 |
| 4,431,452 | 2/1984 | Comper et al. | 106/287.14 |
| 4,436,857 | 3/1984 | Kuan et al. | 524/260 |
| 4,619,705 | 10/1986 | Dixon et al. | 427/150 |
| 4,780,225 | 10/1988 | Mowdood et al. | 252/28 |
| 4,857,397 | 8/1989 | Mowdood et al. | 428/323 |

FOREIGN PATENT DOCUMENTS

| | | |
|---|---|---|
| 2360871 | 6/1974 | Fed. Rep. of Germany . |
| 233558 | 3/1986 | Fed. Rep. of Germany . |
| 233559 | 3/1986 | Fed. Rep. of Germany . |
| 1582466 | 4/1969 | France . |
| 59-027939 | 2/1984 | Japan . |
| 60-203649 | 10/1985 | Japan . |
| 61-293233 | 12/1986 | Japan . |
| 6902507 | 3/1969 | South Africa . |
| 1198093 | 7/1970 | United Kingdom . |
| 2128196 | 4/1984 | United Kingdom . |

OTHER PUBLICATIONS

Article, "Improvement of the Formula of Release Compositions", Belousov et al., Kauch. Rezina, (8), 36–38 1988.

Article, "Water Resistant Release Coating for Uncured Rubber", Kuan et al., Rubber Chem. Technology, 54 (5) 1124–1131 (1981).

*Primary Examiner*—Paul J. Thibodeau
*Assistant Examiner*—Hoa T. Le
*Attorney, Agent, or Firm*—Harold H. Flanders; Alec H. Horn; Robert L. Price

[57] ABSTRACT

An anti-tack composition and method based on a kaolin clay/nonionic surfactant of intermediate HLB is disclosed where the surfactant is preferably an ethoxylated, acetylenic diol or octylphenal.

13 Claims, No Drawings

SURFACTANT TREATED CLAYS USEFUL AS ANTI-TACK AGENTS FOR UNCURED RUBBER COMPOUNDS

BACKGROUND OF THE INVENTION

In general, the present invention relates to anti-tack agents and more specifically to surfactant treated clays useful as anti-tack agents for uncured rubber compounds.

In the manufacture of finished rubber goods, an important intermediate process step involves the application of an anti-tack agent. The anti-tack agents are used to prevent the sticking together of compounded, uncured rubber pieces which often come into contact with one another. The rubber compound may be in the form of large sheets, that are often intentionally stacked on pallets as interim storage for the next manufacturing step, or may consist as small pellets/granules of rubber. In either case, it is more desirable to prevent these rubber materials from sticking together as adhesion can result in non-processable compound that usually becomes waste product.

Anti-tack agents for rubber have been traditionally applied in one of two general fashions to the rubber stock, which include wet and dry dusting type processes respectively. The anti-tack agents of the present invention deals specifically with nonionic surfactant treated clays useful in reducing surface tack when applied to rubber stock as an aqueous clay slurry. It is well known to those skilled in the art, that mineral based slurries can be applied to rubber stock to yield a thin, detackifying coating on the surface. Such mineral based slurries have been applied to rubber stock by means of a dip tank (generally referred to in the industry as slab-dip) or by spray coating on the mineral slurry via some liquid atomization device. Minerals known to be useful in such slurry compositions include waterwashed or airfloated kaolin clays, ball clays, smectite-type clays like bentonite or montmorillonite, calcium carbonate, talc, etc. More of these minerals, with the possible exception of talc, have little if any natural affinity for the rubber stock when brought into slurry contact with the organophilic rubber surface. This is a direct consequence of the hydrophilic nature of most minerals. Thus, to enhance their chemical affinity for the rubber surface, chemical additives (primarily zinc or calcium soaps of stearic acid) have customarily been used in combination with such minerals to yield effective aqueous anti-tack compositions. It is also well known that such mineral/soap compositions will often employ other process additives (such as organic surfactants) to help aid wet-out and improve general mineral to soap compatibility. Some Literature references relative to the prior anti-tack technology are sited below:

1. G. V. Belousov, N. B. Selezneva, O. Ya. Zrazhevskaya, Yu. G. Shevchenco; "Improvement of the Formula of Release Compositions"; Kauch. Rezina, (8), 36–38 (1988).

2. S. K. Modwood, G. P. Patitsas, W. H. Waddell; "Lubricant and Use Thereof for Curing Tires"; U.S. Pat. No. 4,780,225 (1988).

To our knowledge, organic surfactants currently used in slab-dip systems have been present primarily as an auxiliary additive to augment the performance of mineral/soap anti-tack compositions. This is in stark contrast to the composition of the present invention, wherein an ethoxylated acetylenic diol, nonionic surfactant treated fine particle size kaolin clay is shown to have useful, unique anti-tack properties for various uncured rubber compounds. We know of no prior examples where an organic surface has been used strictly alone with a clay mineral to yield an effective slurry anti-tack composition. This situation, as we will later demonstrate, undoubtedly arises from the fact that most organic surfactants we have examined were not effective enough to be used alone with just kaolin clay. The ethoxylated acetylenic diol nonionic surfactants used with kaolin clay in this invention were found to offer unique wetting properties on rubber compound and therefore represent an unobvious improvement in the rubber anti-tack processing art.

Accordingly, it is an object of the present invention to provide a new, lengthy effective anti-tack composition and method which overcomes the deficiencies of the prior art as described above.

Other objects and a fuller understanding of the invention may be had by referring to the following specification taken in conjunction with the accompanying claims.

It has now been discovered that we may overcome the deficiencies of the prior art and achieve our objectives by providing a novel anti-tack composition comprised of a fine particle size kaolin clay and a nonionic surfactant of intermediate value in its hydrophile-lipophile balance (HLB).

DESCRIPTION OF THE PREFERRED EMBODIMENT

A novel anti-tack composition is described herein comprised of a fine particle size kaolin clay and a nonionic surfactant of intermediate range hydrophile-lipophile balance (HLB) value (i.e., HLB's from 5.0 to 11.0). The nonionic surfactant of choice, more preferably Surfynol 440, ethoxylated acetylenic diol, nonionic surfactant, produced by Air Products and Chemicals, Inc., Allenton, Pa., of HLB 8.0, is employed as an active percent treatment level of 0.05–1.0% (as based on dry clay), or more preferably at treatment levels of 0.2–0.4%. The slurried Omnifil® fine particle size, East Georgia kaolin clay product produced by J. M. Huber Corp., Huber, Ga., Surfynol 440 nonionic surfactant composition of this invention was found to be useful if effectively coating rubber sheet or granules to prevent their sticking together during the manufacture of various finished rubber goods (like tires). The anti-tack performance of this clay/surfactant composition is unexpected relative to the prior art processes wherein zinc or calcium soaps of stearic acid have typically been employed in combination with clay, surfactants, and other additives to achieve the necessary performance properties. The numerous advantages offered by the clay/surfactant composition of the present invention as an anti-tack agent for rubber are summarized below:

The treatment of Omnifil clay with 0.3% Surfynol 440 surfactant is easily achieved by adding the required amount of neat surfactant directly to a well mixed aqueous slurry of the clay. Omnifil® is a J. M. Huber fine particle size, East Georgia waterwashed kaolin clay of low brightness that is commercially available in slurry form at approximately 68% solids. Incorporation of the Surfynol 440 surfactant can be readily achieved by adding it to the 68% solids slurry in a standard commercial mixing tank. Alternatively, treatment can be achieved in a continuous fashion by metering in the required surfactant level into a clay slurry line by means of an in-line injection/static mixer system. The 0.3% Surfynol addition causes a slight but manageable increase in clay slurry Brookfield viscosity. This viscosity behavior is in contract to many of the other nonionic surfactants we tested in that they produced high viscosity increases or even yielded thick gels. The ease of manufacture associated with our Surfynol surfactant treated Omnifil ® clay slurry product along with its lower raw material costs resulting from the elimination of soaps, etc. have combined to yield an anti-tack composition of extremely low cost.

The physical form of the Surfynol surfactant treated Omnifil ® clay slurry product is unique relative to most of the commercially available clay-based slab-dips on the market which are viscous, paste products of only 50% active solids. The 68% solids slurry of the present invention has good suspension stability yet can be easily pumped with centrifugal or Moyno type pumps. These properties enable the slurry of the present invention to be easily shipped in bulk tank truck rather than in just 55 gallon drums, which in combination with its higher solids content offers significant advantages in freight cost to the customer. On site, the slurry of the present invention can be reduced in percent solids to the desired applications level by simply mixing in water.

Spray-dried, bagged product of the present invention is another unique physical form made available by the present invention of Surfynol surfactant treated clay technology. The 68% solids slurry of the present invention can be reduced in solids with water to approximately 60% and then spray-dried using a standard commercial Niro drier operating at drying conditions typical for kaolin clays. The spray-dried, treated clay can then be easily redispersed in water with minimal mixing and still provides (at a given solids level) all the same coating/anti-tack performance properties as the original Surfynol surfactant treated clay slurry. In most cases, the dry product of the present invention can be added directly to the dip tank rather than required a separate mixing tank for dispersion. In terms of low freight costs and customer ease of use, the spray-dried product of the present invention also offers many advantages relative to the conventional paste-type clay slab-dips.

In commercial dip tank processes, the percent slurry solids required for good coating coverage by the reslurried treated clay product of the present invention have typically fallen with the 8-22% solids range. The exact solids requirements depend mostly on the particular type of rubberpolymer being coated. In addition, lower slurry solids are generally required for good coating coverage when hot rubber stock is being dipped versus cool or cold stock. Another advantage of the anti-tack composition of the present invention is a low product depletion rate such that maintaining sufficient dip tank solids can be normally limited to one per shift or less.

The Surfynol surfactant treated Omnifil ® products of the present invention provide good anti-tack coating coverage on a wide array of rubber polymers when applied as a slurry slab-dip to rubber sheet or when slurry spray coated onto rubber granules. It is truly remarkable that the Surfynol surfactant treated clays described in the present invention have the versatility to perform effectively as anti-tack agents at moderately low solids conditions (slab-dip) as well as at high solids conditions associated with spray-coating. The Surfynol surfactant treated clay slurry of the present invention exhibits low foaming tendencies and trays well suspended even at low percent solids with minimal tank agitation/recirculation. The product's low foaming characteristic is particularly desirable versus the high foam levels often generated from soap containing formulations. Excessive foam levels or excessive mineral sedimentation in dip tanks create a housekeeping problem and can lead to undesired shutdown time for system cleanouts.

The Surfynol surfactant treated clay coating deposited onto the rubber stock is easily dispersed into the compound with additional processing (subsequent compounding or extrusion). The coating components also have no deleterious effects on rubber physical properties.

In the most preferred embodiment of the present invention, a treated clay product slurry having adjusted solids of approximately 62% is used to spray coat an uncured rubber compound for providing good anti-tack coverage. This 62% slurry system is particularly well suited for spray coating applications for the following reasons:

a. In a spray coating application, it is desirable to have a high solids clay slurry (60+% solids is ideal). Minimizing the amount of available water in such clay coatings is very advantageous since there will be less drying time required and less likelihood of any material runoff.

b. In order to effectively spray atomize a high solids slurry, that clay slurry must have a low Brookfield viscosity. A Brookfield (20 rpm) viscosity of less than 150 cps is highly recommended. At approximately 62% solids, the clay product slurry of the present invention is easily spray atomized (Brookfield viscosity equals only 45-50 cps) and subsequently provides excellent, uniform surface coverage on rubber granules.

It should also be noted that kaolin clays other than Omnifil ® clay can be utilized in our anti-tack compositions equally well. Omnifil ® was initially chosen as the base clay for most of the development work because it is a low cost, waterwashed clay of low brightness. Since initial the target application area consisted mainly of black rubber compound, clay brightness was therefore of little value. However, for white sidewall tire applications, waterwashed clays of higher brightness (such as Huber HG-90) can be used to replace the Omnifil ® clay. This feature affords a great deal of flexibility as the final product can be early tailored to meet the brightness requirements of the end-use rubber application. Another desirable feature of the present invention is the low alpha quartz level connected with using waterwashed kaolin clays.

The present invention is further illustrated by the following examples, which should be regarded as illustrative, demonstrating only some of the preferred embodiments and not limiting the present invention, its scope or any equivalency. Unless otherwise indicated all parts and percentages in the specification and claims are based upon weight.

EXAMPLE 1

This experiment illustrates the significant performance differences found among various treated Omnifil ® clays when said products are examined as anti-tack agents for preventing the adhesion of uncured rubber polymers, like polybutadiene. In each case, 62% solids slurries of treated Omnifil ® clay were prepared for testing using a 0.3% active treatment level of organic modifier. The organic modifiers that we originally examined with kaolin clay included:
1. Organic Surfactants
   Nonionic
   Anionic
   Cationic
2. Organosilanes
   Alkylsilanes
   Organofunctional Silanes The treated clay slurries of 62% solids were then evaluated an anti-tack agents for rubber. Small strips of cold polybutadiene (PBR) stock (approximately 6 inches$\times$1 inch$\times$0.25 inches) were individually dipped into clay slurry product, left totally immersed for 5 seconds, removed and then air dried over 24 hours to yield a clay coated specimen. The coating coverage, surface tackiness and percent weight pickup were assessed to determine the relative effectiveness of each test system.

TABLE I

Anti-Tack Performance of Various Surfactant/Silane Treated Clays on Polybutadiene Rubber

| Test System | Surfactant/ Silane Name | Chemical Family[2] | Surfactant "HB" | Treated Clay Slurry Viscosity, cps (Brookfield) 20 rmp | Coating Coverage[3] | Surface Tackiness[4] | Coating Pickup wt. %[5] |
|---|---|---|---|---|---|---|---|
| | Om[1]-Clay with active Treatment (62% Solids Slurry) | | | | Coated Rubber Properties | | |
| A | — | — | — | 30 | Poor | Yes | 1.2 |
| B | Surfynol 440 | Ethoxylated Acetylenic Diol, (N) | 8.0 | 45 | Excellent | No | 2.0 |
| C | Igepal CA-210 | Ethoxylated Octylphenol, (N) | 4.8 | 50 | Fair | Yes | 2.0 |
| D | Igepal CA-420 | Ethoxylated Octylphenol, (N) | 8.0 | 70 | Good | No | 1.9 |
| E | Igepal CO-530 | Ethoxylated Nonylphenol, (N) | 10.8 | 2250 | Excellent | No | 8.7 |
| F | Emsorb 2720 | Ethoxylated Sorbitan Monolaurate, (N) | 7.2 | 85 | Poor | Yes | 1.3 |
| G | Alkamuls PSMO-5 | Ethoxylated Sorbitan Monooleate, (N) | 10.0 | 100 | Poor | Yes | 1.7 |
| H | Trylox 5921 | Ethoxylated Hydrogenated Castor Oil, (N) | 8.4 | 540 | Poor | Yes | 2.4 |
| I | Emerest 2622 | Ethoxylated Glycol Dilaurate, (N) | 7.6 | 55 | Poor | Yes | 1.4 |
| J | Neodol 23-3 | Ethoxylated Lauryl Alcohol, (N) | 8.0 | 1800 | Good | No | 4.9 |
| K | Alkasurf L-5 | Ethoxylated Lauric Acid, (N) | 9.8 | 55 | Fair | Yes | 2.0 |
| L | Triton GR-7M | Dioctyl Sodium Sulfosuccinate, (A) | — | 65 | Fair | Yes | 1.4 |
| M | PSVS | Polysodium Vinyl Sulfonate, (A) | — | 190 | Poor | Yes | 2.4 |
| N | Gantrez AN-139 | Poly(Methyl Vinyl Ether/Maleic Anhydride) Ammonium Salt (A) | — | 1430 | Poor | Yes | 5.8 |
| O | Prosil 9234 | Octyltri- Ethoxysllane | — | 53 | Poor | Yes | 1.3 |
| P | Y-9616 | 3- Mercaptopropyl trimethoxysilane | — | 4400 | Good | No | 12.6 |
| Q | PTMO | n- Propyltri- methoxysilane | — | 50 | Poor | Yes | 1.3 |
| R | Z-6020 | N-2-Aminoethyl- 3-Aminopropyltri- | — | 4075 | Good | No | 22.9 |

TABLE I-continued

Anti-Tack Performance of Various
Surfactant/Silane Treated Clays on Polybutadiene Rubber

| | | Om[1]-Clay with active Treatment (62% Solids Slurry) | | | Coated Rubber Properties | | |
|---|---|---|---|---|---|---|---|
| | | | | Treated Clay Slurry | | | |
| Test System | Surfactant/ Silane Name | Chemical Family[2] | Surfactant "HB" | Viscosity, cps (Brookfield) 20 rmp | Coating Coverage[3] | Surface Tackiness[4] | Coating Pickup wt. %[5] |
| | methoxysilane | | | | | | |

Note:
[1]Om-Clay = OMNIFIL TM (J. M. Huber fine particle size, East Georgia Kaolin clay product).
[2]Letter designations in parenthesis denote surfactant type represented:
[3]Qualitative, visual assessment of the overall coating coverage uniformity present on the dipped polybutadiene rubber strip (after air drying).
"Poor" = extremely spotty coating coverage (less than 50% coverage).
"Fair" = significant areas of rubber surface were without coating coverage (approximately 50-75% coverage obtained).
"Good" = virtually all the rubber surface was coated, but notable variations in coating thickness existed.
"Excellent"= rubber surface was completely coated and very uniform.
[4]Qualitative assessment of rubber anti-tack performance wherein a non-coated rubber strip was lightly hand-pressed against a coated test strip to detect sticking:
Yes - denotes that the strips wanted to stick together.
No - denotes that virtually no tendency to stick together was detected.
[5]Quantitative determination of the relative weight % of clay coating picked up on a PER test strip (after air dried). Values represent the average of 4 test specimens.

As can be seen from the summarized results of TABLE I, few modified clay systems offered excellent or even good coating coverage on the PBR strips. Among those which did offer good coating coverage, only two (test systems B and D) had slurry Brookfield viscosities of less than 150 cps. A low slurry viscosity at high solids is needed if these clay slurries are to be used in a commercial spray-coating application of rubber granules. High slurry solids are advantageous when spray coating on an anti-tack system, as reduced drying time and less material runoff normally results. It should also be pointed out that it is highly desirable to have good anti-tack performance provided on a given rubber stock with coating coverage limited to a percent pickup value of 2.0% or less by weight. This criteria is necessary to insure that the overall specific gravity of the rubber compound being coated is not significantly changed by the process. Several test systems (most notably E, J, P, and R) provided good coating coverage but did so at the expense of unacceptably high pickup levels. The percent pickup for these treated clay systems can be adjusted down; however, this requires that slurry solids fall well below the 60+% solids range desired for a spray coating application.

Based on our test results, only test systems B and D meet all the anti-tack performance criteria discussed above. These systems consist of Omnifil ® clay treated with 0.3% Surfynol 440 and Igepal CA-420 surfactants, respectively. Both of these organic modifiers are nonionic type surfactants of intermediate HLB value. Surprisingly, other nonionic surfactants of similar HLB (in test systems F, G, H, I, J, and K respectively) were largely ineffective for providing anti-tack properties. This points to the unexpected uniqueness of the Surfynol 440 and Igepal CA-420 surfactants in this Application. It is also quite interesting to note that true organo-modified clays produced from silane coupling agents were not very effective. Anionic surfactants were generally not effective as well. Various cationic surfactants (of the quaternary amine family) were also originally tried but none were tested since they all caused immediate, severe flocculation of the kaolin clay.

The test systems of TABLE I were prepared by treating standard, dispersed Ominfil ® clay slurry of 68% solids. The organic modifier was added under vigorous mixing conditions at an active treatment level of 0.3%. After mixing an additional 15 minutes, the treated slurry product was than allowed to age at room temperature for 24 hours before its solids were reduced to 62% for our rubber testing work.

EXAMPLE 2

In this example, the coating coverage and resulting anti-tack performance provided by Surfynol surfactants of HLB'S ranging from 1.0 to 17.0 are compared as components of our clay/surfactant slurry composition. These compositions were also compared to a system using Igepal CA-420 surfactant. The test systems of TABLE II were prepared at 62% solids in full accordance with the procedure described in Example 1.

TABLE II

Anti-Tack Performance of Surfynol TM and Igepal TM
Treated Clays on Polybutadiene Rubber

| | | Om-Clay with 0.3% Active Treatment (82% Solids Slurry) | | Coated Rubber Properties | | | |
|---|---|---|---|---|---|---|---|
| Test System | Surfactant Additive | Nonionic Surfactant "HLB" | Treated Clay Slurry Viscosity cps (Brookfield, 20 rmp | Coating Coverage | Surface Tackiness | Coating Pickup, Wt. % | Peel Test, Pounds pull |
| A | Surfynol 104H | 1.0 | 50 | Good | No | 2.3 | 1.3 |
| B | Surfynol 420 | 4.0 | 38 | Good | No | 2.0 | 1.5 |
| C | Surfynol 440 | 8.0 | 30 | Excellent | No | 2.0 | 0.7 |
| D | Surfynol 465 | 13.0 | 45 | Good | No | 1.9 | 1.0 |
| E | Surfynol 465 | 17.0 | 45 | Poor | Yes | 1.1 | Failed |

TABLE II-continued

Anti-Tack Performance of Surfynol ™ and Igepal ™ Treated Clays on Polybutadiene Rubber

| | | Om-Clay with 0.3% Active Treatment (82% Solids Slurry) | | | | | |
|---|---|---|---|---|---|---|---|
| | | | Treated Clay Slurry Viscosity | Coated Rubber Properties | | | |
| Test System | Surfactant Additive | Nonionic Surfactant "HLB" | cps (Brookfield, 20 rmp | Coating Coverage | Surface Tackiness | Coating Pickup, Wt. % | Peel Test, Pounds pull |
| F | Igepal CA-420 | 8.0 | 70 | Good | No | 1.9 | 1.1 |

NOTE:
[1]Om-Clay - OMNIFIL ™ (J. M. Huber fine particle size, East Georgia clay product).
[2]Surfynol ™ Series - Acetylenic Diol (104) and Ethoxylated Acetylenic Diois (420–485); Igepal CA-420 -Ethoxylated Octylphenol.
[3]See footnote #3 of Table 1 for explanation.
[4]See footnote #4 of Table 1 for explanation.
[5]See footnote #5 of Table 1 for explanation.
[6]Physical test method wherein 2 coated strips of rubber (6" × 1" × 0.25" in dimension) are pressed together (via a Carver lab press) using 2000 psi over 5 minutes at room temperature. After equilibrating 24 hours, a Monsanto T-10 Tonsometer was then used to determine the amount of force needed to pull the test strips apart (in lbs.). The term "Failed" denotes that the rubber material tore (or failed) before pull-apart of the strips could be achieved.

The Peel Test data of TABLE II indicate that the Surfynol product of intermediate HLB value (i.e., Surfynol 440) offers the best potential coverage/anti-tack properties for high solids slurry systems targeted for the spray coating of rubber granules. A clay/surfactant anti-tack composition having a 0.3% treatment of Surfynol 440 surfactant thereby represents the preferred embodiment and best mode of the present invention.

EXAMPLE 3

The test data of TABLE III demonstrate that the Ominifil clay/Surfynol 440 surfactant composition of the present invention can also be successfully used as an anti-tack agent in low solids applications as typically employed in continuous rubber slab-dip processes. In this experiment, dispersed Ominifil ® clay slurry treated with 0.3% Surfynol 440 surfactant was reduced in solids to approximately 60% and subsequently spray dried to yield the dry product of the present invention. The spray dried product was then redispersed at the trial site directly in the dip tank (approximately 300 gallons in size) so as to ultimately yield a clay slurry of about 8% solids. Gentle mixing in the dip tank was provided by means of a recirculation/heat exchanger system. After charging the dip tank, an uncured natural rubber compound was then taken off an 84 inch open face, two roll mil as a continuous sheet. The hot rubber sheet (220° F.) was then immediately run through the dip tank system to cool the compound and to put an anti-tack coating on it. Good pickup and coating coverage were achieve with the product of the present invention. The coated rubber sheet was then transported away by means of a moveable rack during which additional cooling/drying was provided with a series of large fans.

TABLE III

Trial Results for Treated Om[1]-Clay In Production-Scale Slab Dip Process

| | Applied | Coated Rubber[2] Properties | | |
|---|---|---|---|---|
| Slab Dip Treatment | Clay Slurry[3] Solids, % | Coating Coverage | Surface Tackiness[4] | Peel Test,[5] Pounds Pull |
| None (uncoated rubber control | — | — | Yes | 1.3 |
| Om-Clay with 0.3% Surfynol 440 | 8.0 | Light but uniform | No | 0.0 |

TABLE III-continued

Trial Results for Treated Om[1]-Clay In Production-Scale Slab Dip Process

| | Applied | Coated Rubber[2] Properties | | |
|---|---|---|---|---|
| Slab Dip Treatment | Clay Slurry[3] Solids, % | Coating Coverage | Surface Tackiness[4] | Peel Test,[5] Pounds Pull |
| Treatment | | coating | | |

Notes:
[1]Om-Clay - OMNIFIL ™ (J. M. Huber fine particle size, East Georgia kaolin clay product).
[2]Test compound was a 40 phr kaolin clay filled Natural Rubber formulation.
[3]Clay slurry was prepared in the dip tank by adding spray-dried, treated Om-Clay product directly to the aqueous dip system to achieve as well as later maintain sufficient slurry solids for providing uniform coating coverage on stock.
[4]See footnote #4 of Table 1 for explanation.
[5]See footnote #6 of Table II for explanation.

As shown in TABLE III, the coated rubber exhibited good anti-tack properties versus the uncoated control. The product was successfully run on this dip system for an additional two weeks where after no evidence of clay sedimentation and/or foam generation were noted in the tank. These particular properties are very advantageous from a plant housekeeping standpoint. The present example serves to further illustrate the versatility of the present invention wherein clay/Surfynol 440 surfactant slurry composition of either high solids (for slab-dip processes) can be successfully utilized to provide anti-tack properties on uncured rubber.

The organophilic clay of the present invention in the form of an aqueous slurry will typically have slurry solids on the order of 67–69%, a Brookfield viscosity at 68% solids, 20 rpm, spindle #2 at 25° C., of 800 max, cps, a dry clay, Technibrite, brightness of 81.0–83.0%, a maximum wet sieve reside at 325 mesh of 0.3%, a pH at 28% solids of 6.0–8.0, an average stokes equivalent particle diameter of 0.3 micrometers, a dry clay B.E.T. surface area of 19–23 m$^2$/g, a dry clay oil absorption of 40–45 g/100 g of pigment, dry clay specific gravity of 2.60 and a 68% solids slurry specific gravity of 1.72.

The organophilic clay product of the present invention in the spray dried form will have the same physical properties as described above with a maximum moisture as produced (2 hours at 105° C.) of not more than 1%. The index of refraction of the product of the present invention is 1.54.

The present invention has been described with reference to its preferred embodiments. It will be understood by those skilled in the art that various changes may be made, various equivalents may be substituted, and various additional advantages may be obtained without departing from the spirit and scope of the present invention. In addition, many substitutions and modifications may be made to adapt to a particular situation or material without departing from the teachings of the present invention.

While the present invention has been described with reference to specific embodiments, this application is intended to cover al of the new, novel, useful and nonobvious features disclosed or taught herein above as well as those various changes and substitutions which may be made by those skilled in the art without departing from the spirit and scope of the appended claims.

We claim:

1. An anti-tack composition consisting essentially of kaolin clay and a nonionic surfactant having a hydrophilic-lipophilic balance (HLB) of from 5.0 to 11.0, said nonionic surfactant selected from the group consisting of ethoxylated acetylenic diols and ethoxylated octylphenols and wherein said composition is 0.05% to 0.4% by weight of surfactant based on weight of dry clay.

2. The composition of claim 1, wherein the composition is in the form of a 60 to 70% slurry of solids in water.

3. The composition of claim 1, wherein the composition is in the form of a spray-dried product.

4. The composition of claim 1, wherein the HLB is 8.0.

5. The composition of claim 2, when HLB is 8.0.

6. The composition of claim 2, wherein the Brookfield viscosity is less than 150 CPS.

7. The composition of claim 1, wherein the composition is in the form of an 8 to 22% slurry of solids.

8. The composition of claim 7, wherein the HLB is 8.0.

9. The composition of claim 7, wherein the surfactant is an ethoxylated acetylenic diol with an HLB of 8.0, the slurry concentration is 8% and the surfactant is present in an amount of 0.3% of the clay, based on weight of dry clay.

10. A method of reducing the tack of uncured rubber compounds comprising:
   (a) treating kaolin clay with from 0.05 to 1.0% by weight (based on dry clay weight) of a nonionic surfactant having a hydrophile-lipophile balance form 5.0 to 11.0 selected from the group consisting of ethoxylated acetylenic diols and ethoxylated octylphenols, and
   (b) contacting the surface of said rubber compounds with an aqueous slurry of the composition of step (a) for at least 5 seconds to provide a coating pickup value of said composition of 2.0% or less by weight.

11. The method of claim 10, wherein the composition of step (a) is added to water to yield a slurry of from 60 to 70% solids.

12. The method of claim 11, wherein the slurry is spray dried, the dried product reslurried to an 8 to 22% solids slurry and said resulting reslurry contacted with the rubber compounds.

13. The method of claim 11, wherein the slurry is adjusted to provide an adjusted slurry solids of approximately 62% and said adjusted slurry is used to spray coat an uncured rubber compound.

* * * * *